United States Patent
Horiuchi et al.

[19]

[11] Patent Number: 5,841,598
[45] Date of Patent: Nov. 24, 1998

[54] INFORMATION RECORDING/REPRODUCING APPARATUS AND DATA PROCESSING METHOD

[75] Inventors: Tadashi Horiuchi; Toshihiro Ogata, both of Hachioji; Takumi Soga, Sagamihara, all of Japan

[73] Assignee: Olympus Optical Co., Ltd., Tokyo, Japan

[21] Appl. No.: 545,507

[22] Filed: Oct. 19, 1995

[30] Foreign Application Priority Data

Oct. 28, 1994 [JP] Japan ................................. 6-265889
Mar. 17, 1995 [JP] Japan ................................. 7-059321
Apr. 14, 1995 [JP] Japan ................................. 7-089664

[51] Int. Cl.⁶ ............................................... G11B 27/36
[52] U.S. Cl. ...................... 360/31; 360/53; 360/74.1; 360/27; 369/44.39; 369/58
[58] Field of Search ...................... 371/37.4, 31; 369/58, 369/54, 120; 386/109; 395/182.13, 182.06, 185.04, 250, 489, 440; 365/13

[56] References Cited

U.S. PATENT DOCUMENTS

| | | | |
|---|---|---|---|
| 4,760,576 | 7/1988 | Sako ..................................... | 371/37.4 |
| 4,949,326 | 8/1990 | Takagi et al. ............................. | 369/54 |
| 5,313,471 | 5/1994 | Otaka et al. ............................. | 371/31 |
| 5,438,560 | 8/1995 | Lee ......................................... | 369/58 |
| 5,442,614 | 8/1995 | Tamegai .................................. | 369/58 |
| 5,585,933 | 12/1996 | Ichige et al. ........................... | 386/109 |

FOREIGN PATENT DOCUMENTS 64-10358  1/1989  Japan.
2-165248  6/1990  Japan.

*Primary Examiner*—Tod R. Swann
*Assistant Examiner*—Fred Fei Tzeng
*Attorney, Agent, or Firm*—Armstrong, Westerman, Hattori, McLeland, & Naughton

[57] ABSTRACT

An information recording/reproducing apparatus for recording or reproducing information on or from a recording medium in response to a command sent from a host computer has a cache memory serving as an intermediate memory and temporarily storing information to be transferred to or from the host computer. In response to an information record command sent from the host computer, completion of writing of information is reported to the host computer at the end of storing record data transferred from the host computer in the cache memory. The record data stored in the cache memory is written on a recording medium independently of data transfer between the host computer and intermediate memory. In response to an information playback command sent from the host computer, it is determined whether playback data requested by the host computer is consistent with unprocessed record data stored in the cache memory. When the playback data is inconsistent with or no duplicate of the unprocessed record data, writing of data from the cache memory onto the recording medium is suspended and processing requested with the information playback command is executed as a top priority.

11 Claims, 16 Drawing Sheets

| POSITION (ADDRESS) OF DATA IN CACHE MEMORY | POSITION (ADDRESS) OF DATA ON DISK | CACHE RESIDENT FLAG | WRITTEN-ON-DISK FLAG |
|---|---|---|---|
| 0 | 3 | 1 | 1 |
| 3 | 5 | 1 | 0 |
| 2 | 10 | 0 | 0 |
| 1 | 100 | 1 | 1 |
| ⋮ | ⋮ | ⋮ | ⋮ |

INFORMATION RECORDING/ REPRODUCING APPARATUS AND DATA PROCESSING METHOD

BACKGROUND OF THE INVENTION

1. Field of the Invention

The present invention relates to an information recording/reproducing apparatus for executing data processing in response to an information record command or information playback command sent from a host computer in the course of recording or reproducing information on or from a recording medium, and to a data processing method employed in the information recording/reproducing apparatus.

2. Description of the Related Art

In general, an information recording/reproducing apparatus is used as an external recording apparatus or the like for an information processing system. The information recording/reproducing apparatus performs recording in which data sent from a host computer is written on a recording medium in response to a command sent from the host computer that is an upper-level unit connected to the apparatus, and also performs reproducing in which data requested by the host computer is read from the recording medium and then transferred.

In this kind of information recording/reproducing apparatus, recording of data on a recording medium is relatively slower than data processing executed by a host computer, and is therefore time-consuming. It often takes much time to complete processing requested with a record or playback command after receiving the command.

In an effort to improve efficiency of data transfer between an information recording/reproducing apparatus and a host computer, Japanese Patent Laid-Open No. 64-10358 has disclosed a data transfer technique in which a cache memory realized with a semiconductor memory or the like is interposed between the information recording/reproducing apparatus and host computer, and data to be transferred is temporarily written in the cache memory in order to reduce a wait time occurring in the host computer.

Especially in an optical disk apparatus using an optical disk as a recording medium, it takes much time to write data on a recording medium. In general, the optical disk apparatus therefore has a disk cache memory for temporarily storing record data or playback data.

A data transfer technique involving a cache memory is what is called a write-after method, wherein data transferred from a host computer is temporarily written in a cache memory and the data stored in the host computer is written on a recording medium at a time independently of any operation of a host computer.

In an information recording/reproducing apparatus having a write-after type cache memory, when data is recorded in response to a record command, as soon as storing of data transferred from a host computer in the cache memory is completed, a command end status word is posted to the host computer. Processing, which appears to be requested with a record command when seen by the host computer, can therefore be terminated prior to completion of writing of data on a recording medium, and then the next command can be received immediately. Unwritten data that has been stored in the cache memory is written on a recording medium at an appropriate time instant during an idle time of data processing.

According to an apparatus adopting the foregoing write-after method, a host computer can restart data processing when recognizing completion of writing after writing data in a cache memory. The host computer need not wait until writing of data on a recording medium is completed. An access time arising during writing can be shortened.

However, as far as the aforesaid known information recording/reproducing apparatus having a cache memory is concerned, while all data is being written from the cache memory to a recording medium, another request cannot be received from a host computer.

Data processing requested with a record command or playback command in the known information recording/reproducing apparatus will be described with reference to FIG. 1. FIG. 1 shows examples of operations to be performed when a plurality of commands are sent successively; that is, when a playback command (read command) is received subsequently to a record command (write command). In the drawings, W denotes a write command. R denotes a read command. ST denotes a command end status word.

When a write command issued from a host computer is received, write data (data (1)) accompanying the command is transferred to a cache memory and stored temporarily therein. As soon as writing of the data (1) in the cache memory is completed, an end status word is returned to the host computer. This enables reception of the next command. The data (1) stored in the cache memory is transferred to and recorded on a recording medium at any time under the control of an information recording/reproducing apparatus independently of an operation of the host computer. When another write command is received subsequently to the write command, as soon as write data (data (2)) is transferred to the cache memory and stored therein, an end status word is sent to the host computer. Thereafter, the data (2) stored in the cache memory is transferred to and recorded on the recording medium at any time.

When a read command is received subsequently to a write command, if write data that has not been written on the recording medium in response to the previous write command still resides in the cache memory, writing of data from the cache memory onto the recording medium is continued. When the writing is completed, processing requested with the read command is executed. Specifically, read data (data (3)) requested by the host computer is read from the recording medium and transferred to the cache memory. The data (3) is then transferred to the host computer via the cache memory.

As mentioned above, in the known apparatus adopting the write-after method, when a read command is issued subsequently to a write command, write data stored in a cache memory is all written on a recording medium and then the read command is received.

Especially when a read command is received immediately subsequently to a write command or when a read command is received subsequently to a write command requesting large-sized data, if unprocessed write data still reside in the cache memory, a wait time occurs until writing of data on a recording medium is completed. Reading is not executed until the writing is completed. It therefore takes much time until an end status word indicating termination of processing requested with a read command is issued after read data is read and transferred to a host computer. The cache memory is therefore not used effectively. Moreover, a long wait time occurs in the host computer. Data transfer is thus achieved inefficiently.

OBJECTS AND SUMMARY OF THE INVENTION

An object of the present invention is to provide an information recording/reproducing apparatus capable of promptly executing processing requested with a playback command succeeding a record command sent from a host computer, and of achieving data transfer to or from the host computer smoothly and efficiently, and a data processing method employed in the information recording/reproducing apparatus.

Another object of the present invention is to provide an information recording/reproducing apparatus having a write-after type cache memory means and making it possible to reduce an access time required for gaining access in response to a read command.

Yet another object of the present invention is to provide an information recording/reproducing apparatus in which when a playback command is received subsequently to a record command sent from a host computer, if the record command is composed of a plurality of consecutive record commands or is a record command requesting large-sized data, playback can be executed and completed soon after the record command is handled, and thus data transfer can be achieved efficiently.

Still another object of the present invention is to provide an information recording/reproducing apparatus capable of utilizing a cache memory effectively for handling a playback command succeeding a record command sent from a host computer.

According to the present invention, there is provided an information recording/reproducing apparatus for recording or reproducing information on or from a recording medium in response to a command sent from a host computer, comprising: an intermediate memory means for temporarily storing information to be transferred to or from said host computer; a writing completion reporting means for reporting completion of information writing to said host computer at the end of storing record data transferred from said host computer in said intermediate memory means; a medium writing means for writing record data stored in said intermediate means on a recording medium independently of data transfer between said host computer and intermediate memory means; a write data judging means for determining whether playback data requested with an information playback command sent from said host computer is consistent with unprocessed record data of which writing on the recording medium has not been completed but has been stored in said intermediate memory means; and a prioritized reading executing means that when an information playback command is issued from said host computer, if playback data requested by said host computer is inconsistent with or no duplicate of unprocessed record data stored in said intermediate memory means, suspends writing of data from said intermediate memory onto a recording medium and executes processing requested with said information playback command as a top priority.

Other features and advantages of the present invention will be fully apparent from the description below.

BRIEF DESCRIPTION OF THE DRAWINGS

FIG. 2 is a block diagram showing an example of the configuration of a major portion of an information recording/reproducing apparatus of the embodiment of the present invention;

FIG. 3 is a block diagram schematically showing the functional configuration of a CPU in the first embodiment;

FIG. 4 is a flowchart describing a sequence of operations of data processing to be followed in the first embodiment when a write command is received from a host computer;

FIG. 5 is a flowchart describing the first half of a sequence of operations of data processing to be followed in the first embodiment when a read command is received from a host computer;

FIG. 6 is a flowchart describing a sequence continuing the first half described in FIG. 5;

FIG. 7 is a timing chart describing operations of data processing to be performed in the first embodiment in such a case that when a read command is received subsequently to a write command, unprocessed write data residing in a cache memory is consistent with or a duplicate of read data requested with a read request;

FIG. 8 is a timing chart describing operations of data processing to be performed in the first embodiment in such a case that when a read command is received subsequently to a write command, unprocessed write data residing in a cache memory is inconsistent with read data requested with a read request;

FIG. 9 is a block diagram schematically showing the functional configuration of a CPU in the second embodiment;

FIG. 10 is a flowchart describing a sequence of operations of data processing to be followed in the second embodiment when a write command is received from a host computer;

FIG. 11 is a flowchart describing a sequence of operations of data processing to be followed in the second embodiment when a read command is received from a host computer;

FIG. 12 is a timing chart describing operations of data processing to be performed in the second embodiment when a read request is issued from a host computer during data record;

FIG. 14 is a block diagram showing the hardware configuration of a disk cache control unit in the third and fourth embodiments;

FIG. 15 is a flowchart describing operations to be performed by a microprocessor in the third embodiment;

FIG. 16 is an explanatory diagram showing a cache memory management table; and

DETAILED DESCRIPTION OF THE PREFERRED EMBODIMENTS

FIGS. 2 to 8 show the first embodiment of the present invention.

Figure 1:
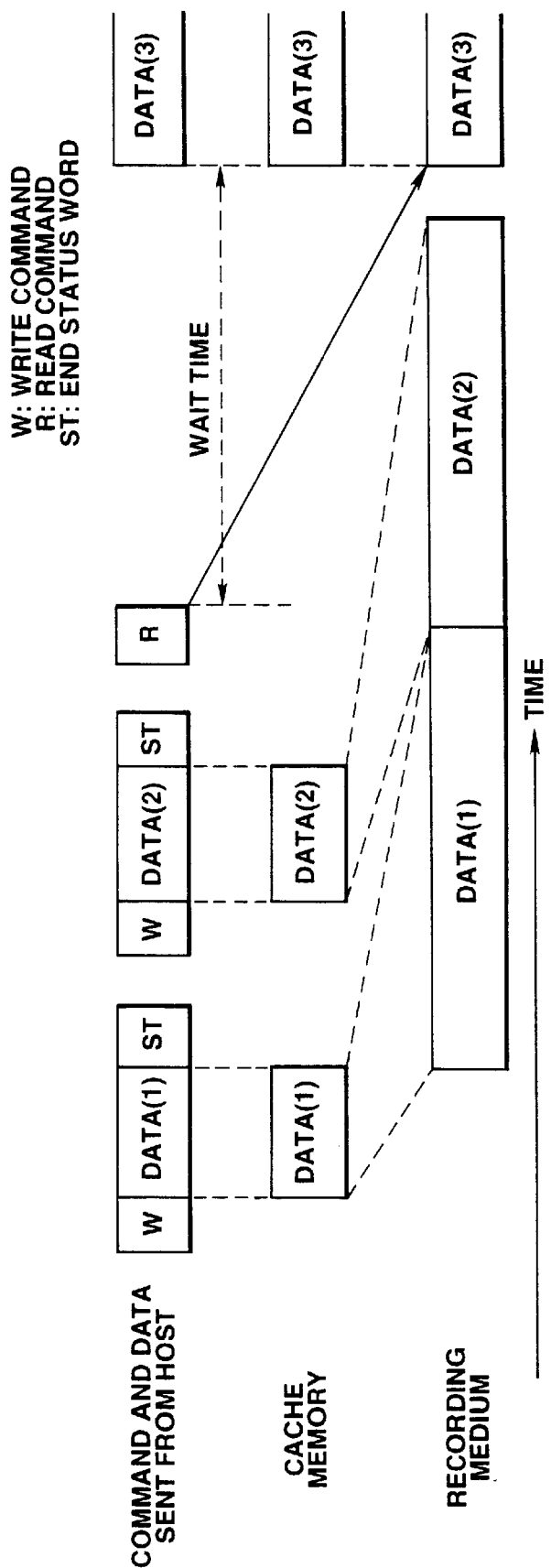
FIG. 1 is a timing chart describing operations of data processing to be performed in a known information recording/reproducing apparatus when a read request is issued from a host computer during data recording.
Figure 2:
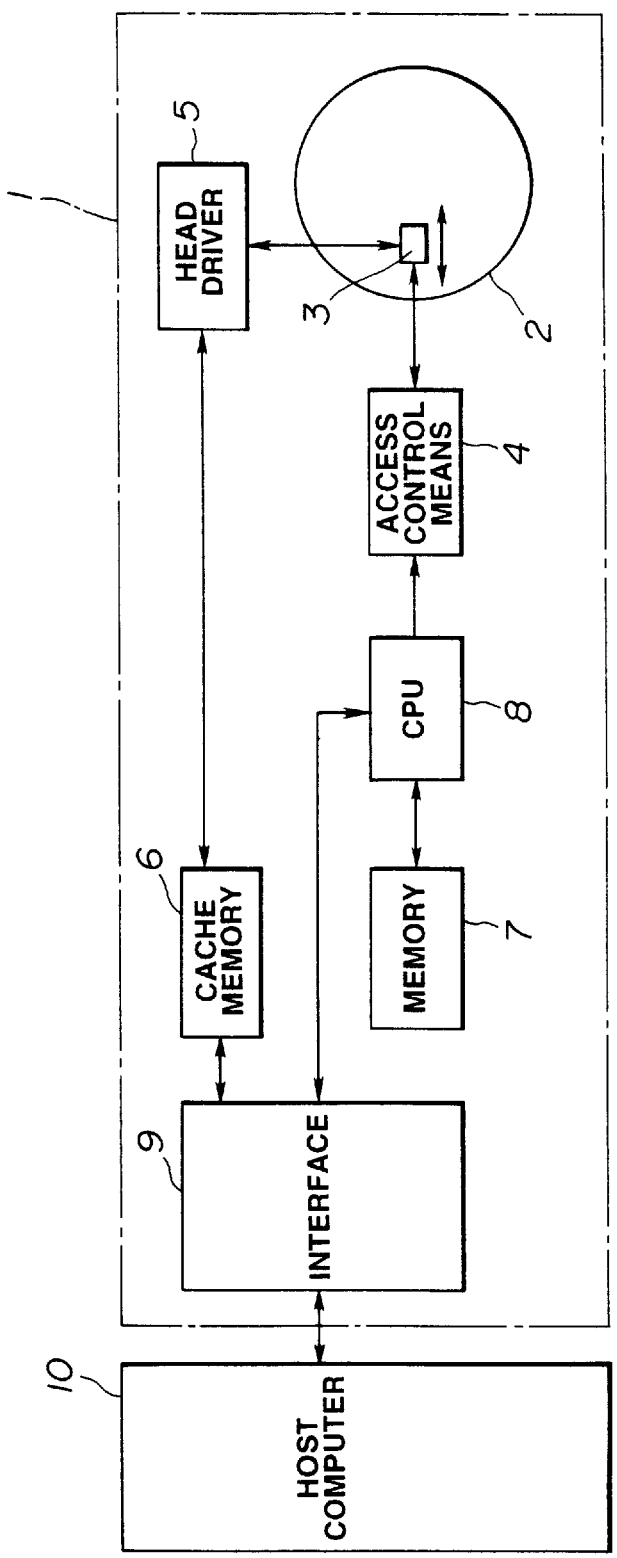
FIGS. 2 to 8 relate to the first embodiment of the present invention.

To begin with, the configuration of a portion of an information recording/reproducing apparatus of this embodiment responsible for recording or reproducing of data will be described. FIG. 2 shows an example of the configuration of a major portion of an information recording/reproducing apparatus. Herein, an optical disk apparatus using an optical disk as a recording medium will be described as an example.

An optical disk apparatus 1 is connected to an upper-level host computer 10 that requests recording or reproducing of information. The optical disk apparatus 1 comprises a head 3 for writing or reading information on or from an optical disk 2 serving as a recording medium, an access control means 4 for controlling the position of the head 3, a head driver 5 having a modulator and demodulator which handle record data or playback data, a cache memory 6 serving as an intermediate memory means for temporarily storing record data or playback data, a memory 7 for storing track information and data size information contained in a command sent from the host computer 10, a CPU 8 serving as a control means responsible for various kinds of control passed in the apparatus, and an interface 9 for transferring a command or data to or from the host computer 10.

Figure 3:
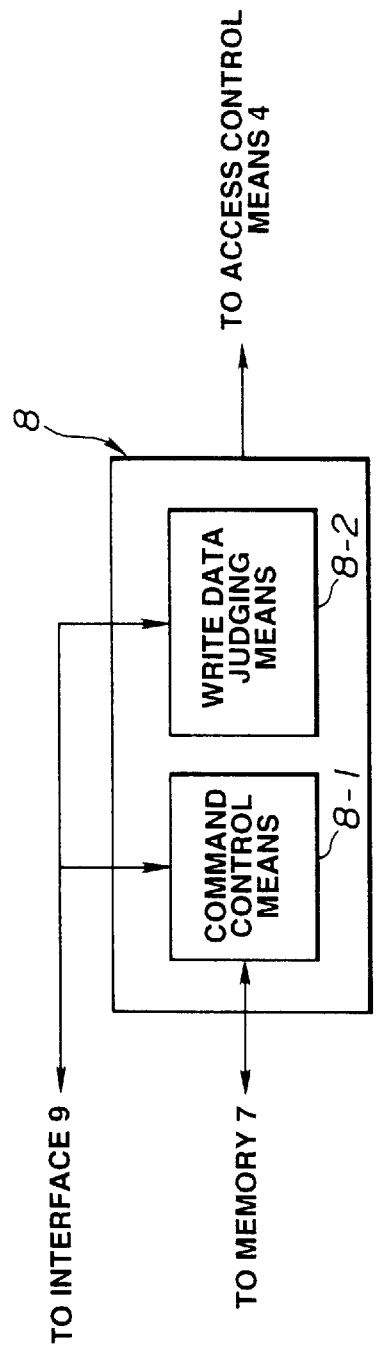

FIG. 3 schematically shows the functional configuration of the CPU 8 in the first embodiment.

The CPU 8 includes a command control means 8-1 for instructing completion of processing requested with a command sent from the host computer 10, and a write data judging means 8-2 for determining whether playback data requested by an information playback command sent from the host computer 10 is consistent with unprocessed record data of which writing on a recording medium has not been completed and which is stored in the cache memory 6. The command control means 8-1 has a writing completion reporting facility for reporting completion of processing requested with an information record command, a reading completion reporting facility for reporting completion of processing requested with an information playback command, and a prioritized reading executing facility that when an information playback command is issued from the host computer 10, if it is determined on a judgment of the write data judging means 8-2 that playback data requested by the host computer is inconsistent with or not a duplicate of unprocessed record data residing in the cache memory, suspends writing of data from the cache memory 6 onto a recording medium and executes processing requested with the information playback command as a top priority.

A command sent from the host computer 10 contains track information and data size information representing the track and data size of object data on a recording medium in addition to the contents of the command. A record command is accompanied with record data.

The optical disk apparatus 1 receives a command from the host computer 10 through the interface 9, and stores track information and data size information contained in the command in the memory 7 realized with a semiconductor memory or the like. In a record area on the optical disk 2, a plurality of tracks are formed spirally or concentrically from an innermost circumference toward an outermost circumference. For recording or reproducing information, a seek operation for moving the head 3 over a plurality of tracks in a direction perpendicular to the tracks is executed in order to position the head 3 on an intended track.

When a command is a record command (synonymous with a write command), record data (synonymous with write data) sent together with the command from the host computer 10 is transferred to the cache memory 6 and temporarily stored therein. Under the control of the CPU 8, the access control means 4 executes the seek operation in order to position the head 3 on an intended track, which is requested with the command, on the optical disk 2. After the seek operation terminates, the write data stored in the cache memory 6 is modulated by a modulator incorporated in the head driver 5. A semiconductor laser, which is not shown, attached to the head 3 is then driven by the head driver 5 so that a recording light beam will be irradiated to the intended track on the optical disk 2 for recording of information.

When a command is a playback command (synonymous with a read command), the CPU 8 allows the access control means 4 to execute seek so that the head 3 can be positioned on an intended track on the optical disk 2 in order to read playback data (synonymous with read data) requested with the command. A reproducing light beam is irradiated to the track in order to read information. After demodulated by a demodulator incorporated in the head driver 5, the read data is transferred to the host computer 10 via the cache memory 6 and interface 9.

In this embodiment, the cache memory 6 is of the write-after type and has the capability of a buffer memory used mainly for recording of data.

The CPU 8 receives a control signal from the host computer 10 via the interface 9 and controls the timing of transmitting or receiving a command according to the control signal. The access control means 4 and head driver 5 are controlled by the CPU 8. The circuit elements of the access control means 4 and head driver 5 are well known. No mention will therefore be made of the circuit elements.

Next, a sequence of operations to be performed in response to a write command or read command on the basis of the data processing technique of this embodiment will be described below.

Figure 4:
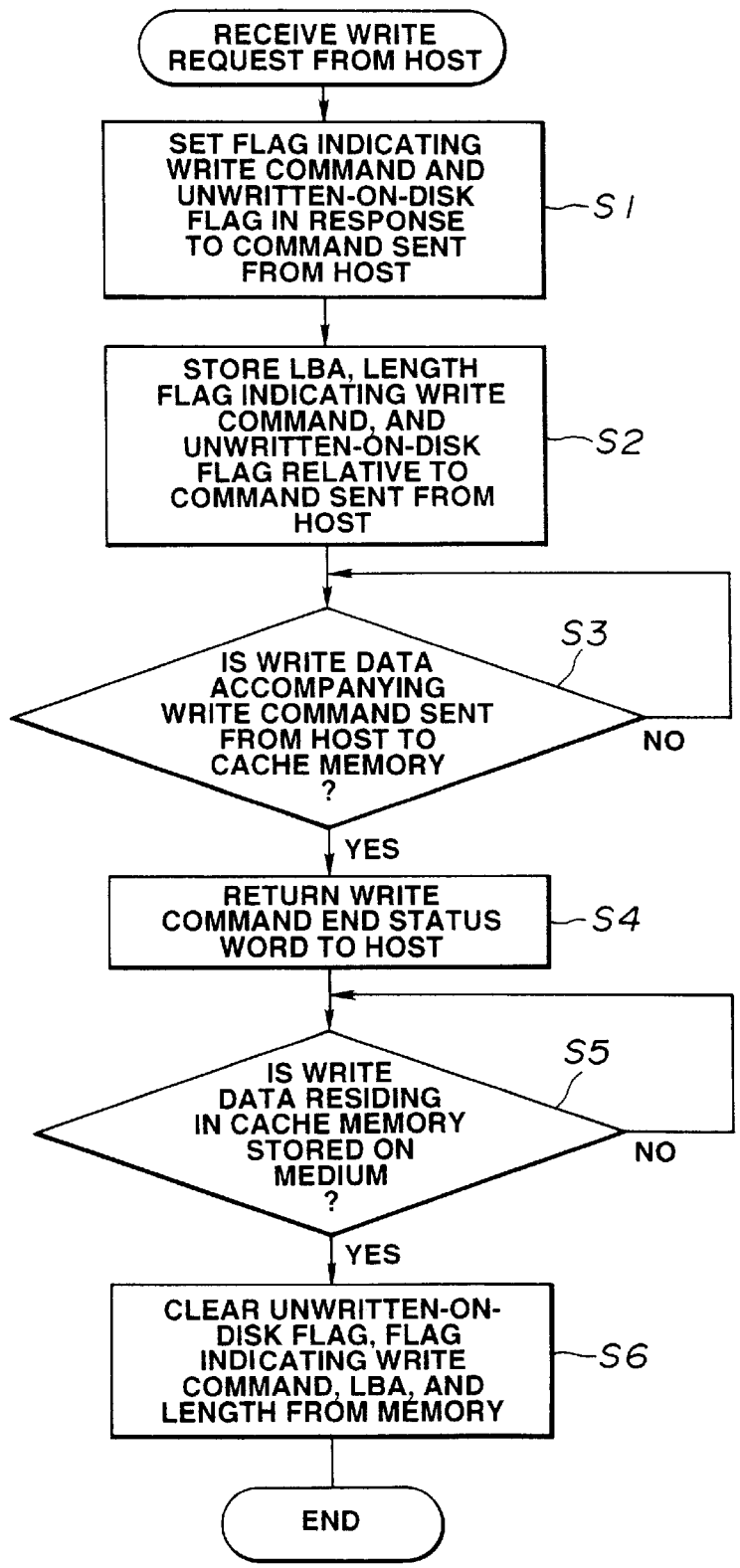

Referring to FIG. 4, a data processing sequence to be followed when a write command is received from the host computer 10 will be described.

After a write command is received from the host computer 10 and when a write request is received from the host computer 10, the CPU 8 sets a flag indicating a write command and an unwritten-on-disk flag in response to the command sent via the interface 9 at step S1. At step S2, a logical block address (hereinafter LBA) that is track information and a length that is data size information, which are contained in the received command, are transferred to the memory 7 and stored therein. The flag indicating a write command and the unwritten-on-disk flag are stored in the memory 7.

At step S3, the CPU 8 transfers write data accompanying the command sent from the host computer 10 to the cache memory 6 and temporarily stores it therein. The CPU 8 determines whether writing of the write data in the cache memory 6 is completed and waits until it is completed.

When it is determined at step S3 that the writing of the write data in the cache memory 6 is completed, control is passed to step S4. The CPU 8 issues a write command end status word indicating termination of the data recording requested with the write command to the host computer 10 via the interface 9. The CPU 8 returns a completion of processing requested indication with the command as a response to the host computer 10. The host computer 10 thus becomes aware of the completion of the processing requested with the write command. This enables the optical disk apparatus 1 to receive the next command.

Next, at step S5, the CPU 8 transfers the write data from the cache memory to the optical disk 2 independently of an operation of the host computer 10, and records the write data on the optical disk 2. The CPU 8 then determines whether writing of the write data on the medium is completed and waits until it is completed.

When it is determined at step S5 that the writing of the write data on the optical disk 2 is completed, control is passed to step S6. The CPU 8 clears the flag indicating a write command, unwritten-on-disk flag, LBA, and length from in the memory 7, and thus terminates data record.

Figure 5:
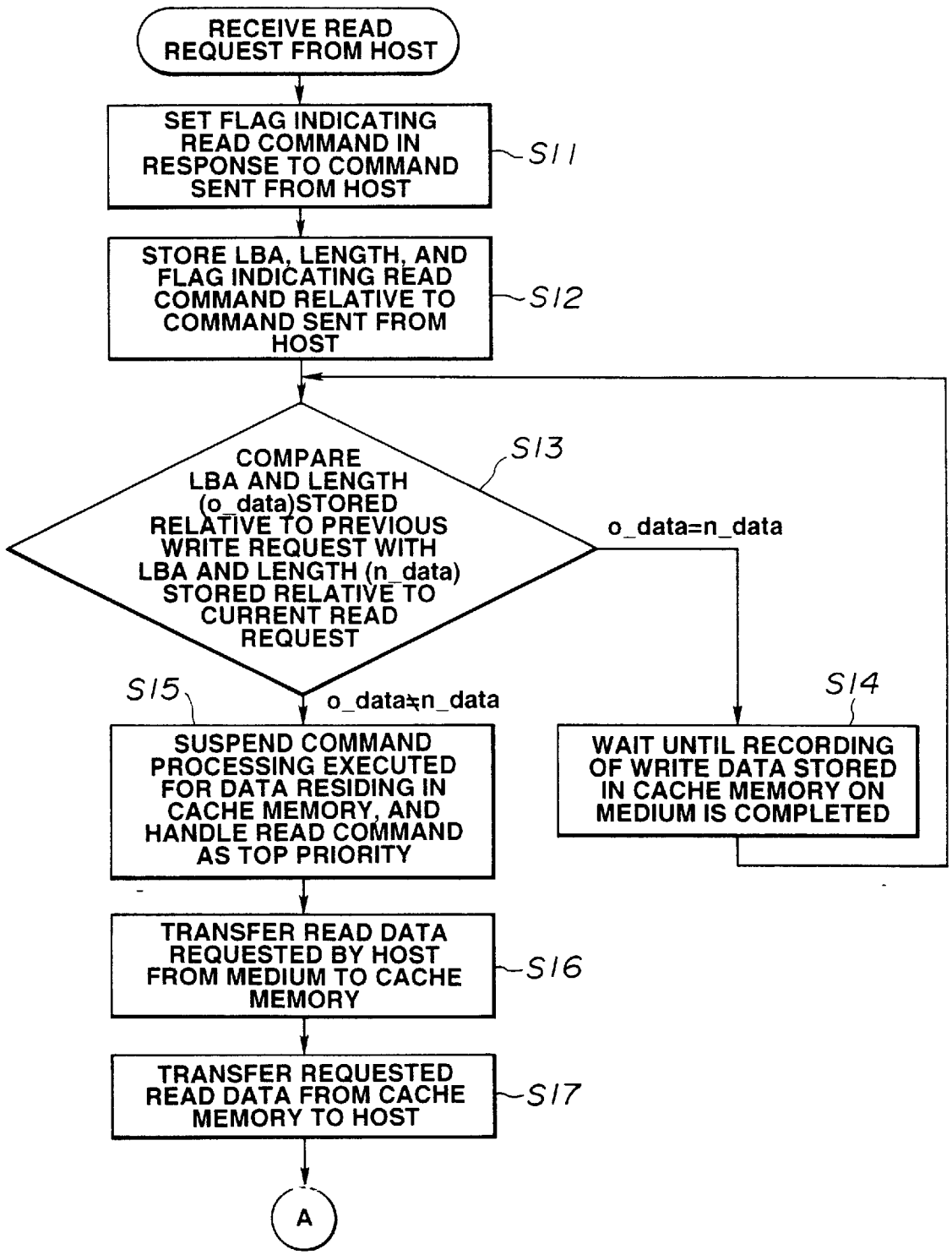
Figure 6:
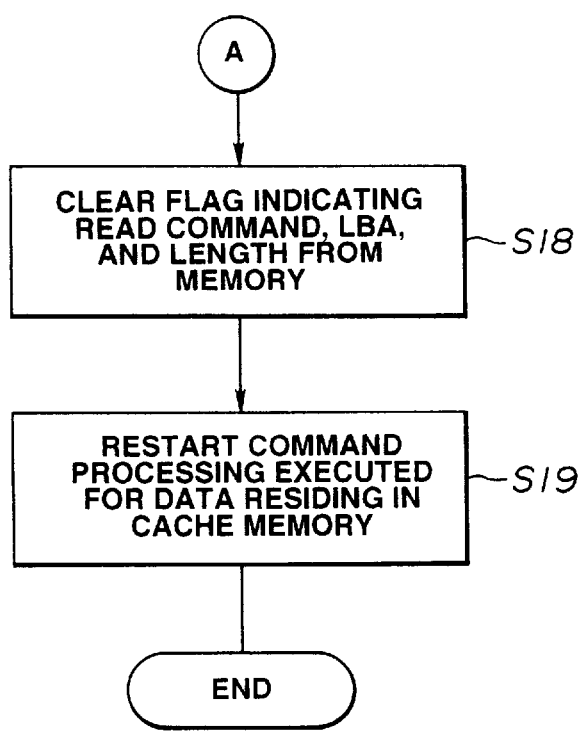

Next, a data processing sequence to be followed when a read command is received from the host computer 10 will be described with reference to FIGS. 5 and 6. The flowcharts of FIGS. 5 and 6 are linked with each other at point A. Herein, a sequence to be followed when a read command is received subsequently to a write command will be described.

After a read command is received from the host computer 10 and when a read request is received from the host computer, at step S11, the CPU 8 sets a flag indicating a read command in response to the command sent via the interface 9. At step S12, the CPU 8 transfers an LBA and length contained in the received command to the memory 7 and stores them therein. The CPU 8 also stores the flag indicating a read command in the memory 7.

The CPU 8 then compares the LBA and length (o_data) stored in the memory 7 relative to a previous write command with the LBA and length (n_data) stored therein relative to the current read command. If it is found at step S13 that the LBA and length (n_data) contained in the read request are consistent with or duplicates of the LBA and length (o_data) contained in the previous write request, control is passed to step S14. The CPU 8 then waits until writing of write data stored in the cache memory 6 onto a medium is completed. At this time, by checking the state of the unwritten-on-disk flag in the memory 7, the CPU 8 recognizes whether the writing of the data on the medium is completed.

When a cache memory employed is of a write-back type in which data stored in the cache memory 6 during recording is read and transferred as it is in response to a read request issued from the host computer 10, data requested with the read request is transferred as read data from the cache memory to the host computer 10 at step S14.

If it is determined at step S13 that the LBA and length (n_data) contained in the read request are inconsistent with the LBA and length (o_data) contained in a previous write request, control is passed to step S15. The CPU 8 suspends command processing executed for the data residing in the cache memory 6; that is, the CPU 8 suspends writing of write data from the cache memory 6 onto a medium and handles the read command as a top priority.

At step S16, data requested with the read request sent from the host computer 10 is read as read data from the optical disk 2 and transferred to the cache memory 6. At step S17, the read data is transferred from the cache memory 6 to the host computer via the interface 9.

When the transfer of read data to the host computer 10 is completed, the CPU 8 issues a read command end status word to the host computer 10, clears the flag indicating a read command, LBA, and length from the memory 7, and thus terminates data playback. Thereafter, at step S19, the CPU 8 restarts command processing which had been started for data stored in the cache memory and then previously suspended, transfers unprocessed write data remaining in the cache memory 6 to the optical disk 2, and then records the write data on the medium.

Figure 7:
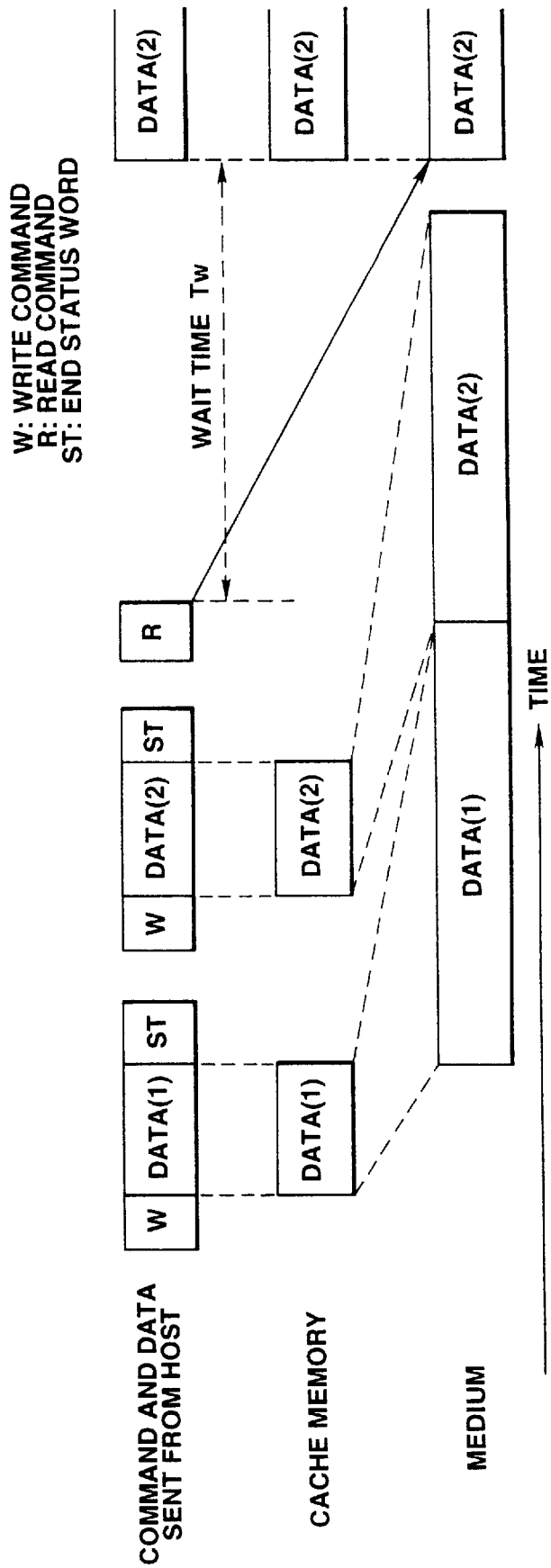
Figure 8:
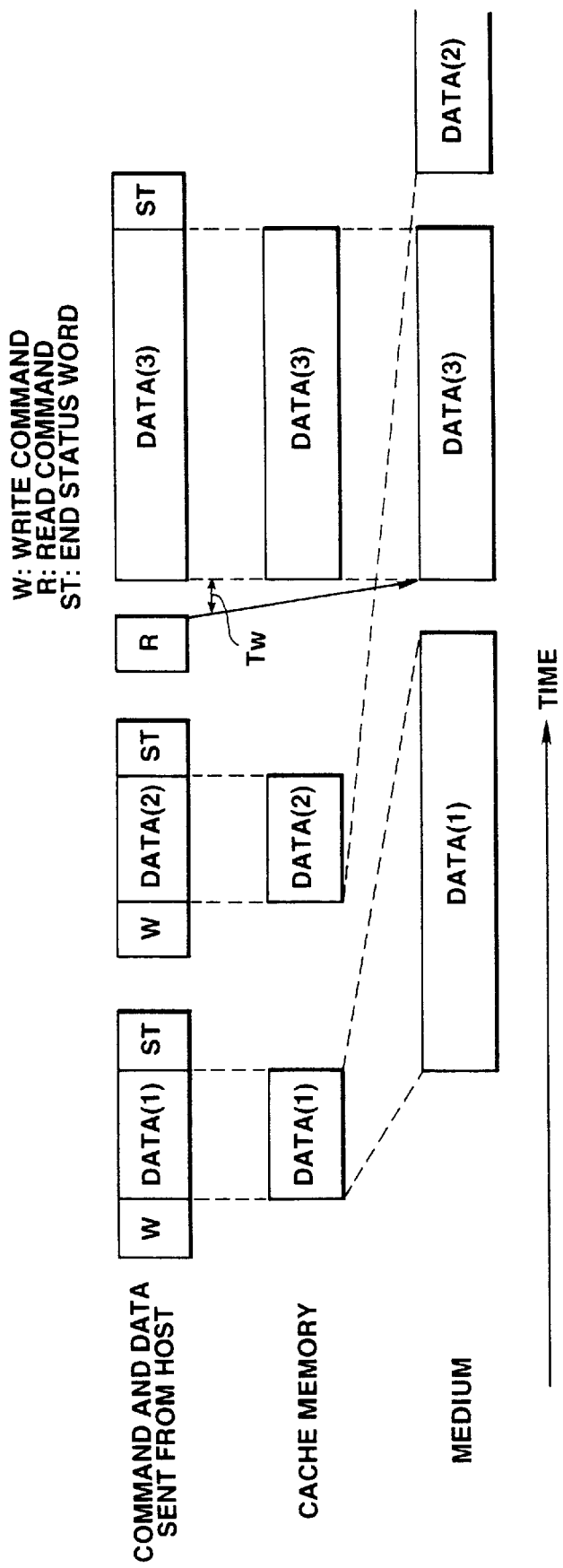

FIGS. 7 or 8 show the timing of operations of data processing requested with a write command or read command in this embodiment. On the assumption that a read command is received subsequently to a write command, FIG. 7 shows timing observed when unprocessed write data residing in the cache memory is consistent with or a duplicate of read data requested with a read request, while FIG. 8 shows timing observed when unprocessed write data residing in the cache memory is inconsistent with read data requested with the read request. In the drawings, W denotes a write command. R denotes a read command. ST denotes an end status word indicating termination of processing requested with a command. The operations of data processing are carried out under the control of the CPU 8 in an optical disk apparatus.

A write command issued from the host computer 10 is sent to the optical disk apparatus. When the write command is received in the optical disk apparatus, write data (data (1)) accompanying the command is transferred to the cache memory 6 and temporarily stored therein.

As soon as the writing of the data (1) in the cache memory 6 is completed, an end status word is returned to the host computer 10. Reception of the next command is enabled. The data (1) stored in the cache memory 6 is then transferred to and recorded on a recording medium independently of an operation of the host computer 10.

As far as an information recording/reproducing apparatus such as an optical disk apparatus is concerned, it takes much time to write data on a recording medium. Data transfer from the cache memory 6 to a recording medium requires several times as much time as data transfer from the host computer 10 to the cache memory 6. Especially when a magneto-optical disk is used as a medium, since three operations of erasure, writing, and verification must be carried out to achieve recording of data, data recording requires tremendous time. When a phase-change type optical disk or WORM optical disk is used, two operations of writing and verification must be performed to achieve recording of data. Data recording is time-consuming.

In this embodiment, when data transfer from the host computer 10 to the cache memory 6 is completed, a command end status word is returned. This permits immediate reception of the next command. Data transfer can therefore be achieved efficiently.

When another write command is received subsequently to a write command, write data (data (2)) accompanying the command is transferred to and stored in the cache memory 6 concurrently with writing of write data (data (1)) from the cache memory 6 onto a recording medium. When the writing of the data (2) in the cache memory 6 is completed, an end status word is sent to the host computer 10. Thereafter, after the writing of the data (1) on a recording medium is completed, the write data stored in the cache memory 6 is transferred to and stored on the recording medium.

When a read command is received subsequently to a write command, similarly to step S13 in FIG. 5, it is determined whether read data requested with a read request is consistent with unprocessed write data of which writing on a recording medium has not been completed and which is stored in the cache memory 6.

If the read data requested with the read request is consistent with or a duplicate of the unprocessed write data residing in the cache memory 6, data processing is carried out as shown in FIG. 7. In FIG. 7, write data (data (2)) accompanying the second write command is requested as read data with a read command.

In this case, after the data (2) stored in the cache memory 6 is written once on a recording medium, processing requested with the read command is executed. The read data (data (2)) requested by the host computer 10 is read from the recording medium, transferred to the cache memory 6, and then transferred to the host computer 10 via the cache memory 6. In this case, a wait time Tw occurs until reading of read data is executed after the read command is received.

When the unprocessed write data in the cache memory 6 is inconsistent with the read data requested with the read request, data processing is carried out as shown in FIG. 8.

In this case, writing of the data (2) from the cache memory 6 onto the recording medium is suspended, and processing requested with the read command is executed as a top priority. Specifically, as soon as the read command is received, read data (data (3)) requested by the host computer 10 is read from the recording medium, transferred to the cache memory 6, and then transferred to the host computer 10 via the cache memory 6. An end status word is sent to the host computer 10. Thereafter, the writing of the write data from the cache memory is restarted. Thus, the data (2) is transferred to and recorded on the recording medium. In this case, the wait time Tw hardly occurs until the reading of the read data is executed after the read command is received.

As mentioned above, in this embodiment, when a read command is received from a host computer, if read data requested to be read is inconsistent with or not a duplicate of unprocessed write data that has been stored in a cache memory in response to a previous write command, writing of data from the cache memory onto a recording medium is suspended and processing requested with the read command is executed as a top priority. Reading of read data is thus executed.

As mentioned above, processing requested with a read command issued subsequently to a write command can be executed immediately. A wait time occurring in the host computer can be reduced. Data transfer to or from the host computer can therefore be achieved smoothly and efficiently.

FIGS. 9 to 12 show the second embodiment of the present invention.

The second embodiment is a constituent example in which data to be recorded is split in predetermined units.

Figure 9:
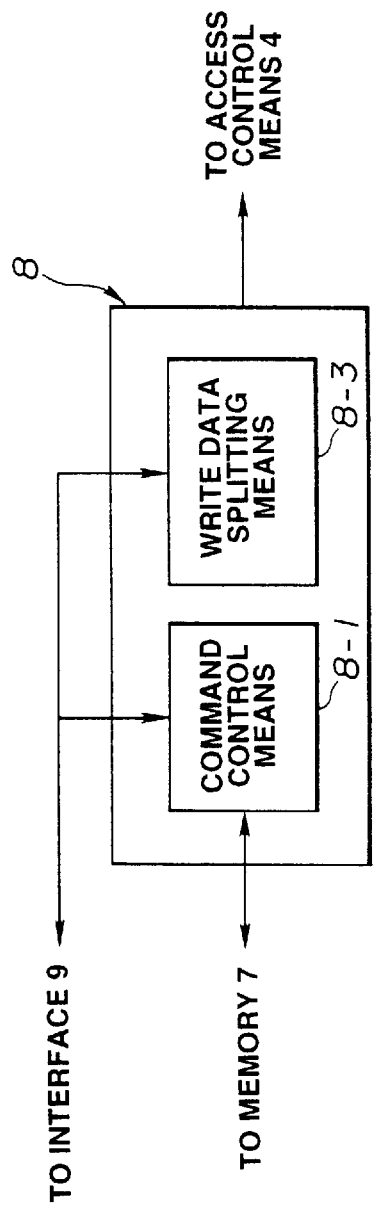
FIGS. 9 to 12 relate to the second embodiment of the present invention.

The hardware configuration of an apparatus of the second embodiment is identical to that of the first embodiment shown in FIG. 2. No mention will therefore be made of the configuration. FIG. 9 schematically shows the functional configuration of the CPU 8 in the second embodiment.

The CPU 8 includes a command control means 8-1 for indicating termination of processing requested with a command sent from the host computer 10 and a write data splitting means 8-3 for splitting record data in the cache memory 6 in units of a predetermined size. The command control means 8-1 has a writing completion reporting facility for reporting completion of processing requested with an information recording command, a reading completion reporting facility for reporting completion of processing requested with an information playback command, and a prioritized reading executing facility for suspending writing of data from the cache memory 6 onto a recording medium in response to a read command sent from the host computer 10, and executing processing requested with the read command as a top priority.

In this embodiment, the CPU 8 has the write data splitting means 8-3. Alternatively, a switch may be attached onto a panel surface of the optical disk apparatus 1 and used to select a split size, or a flag indicating a split size may be appended to a command sent from the computer 10 and transferred to the CPU 8 in the optical disk apparatus 1. These alternatives also enable designation of a split size.

A size in units of which write data is split may be a sector block in units of which write data to be stored in the cache memory 6 is arranged. When write data transferred from the host computer 10 is large in size, the number of portions into which data is split is made larger. Thus, the next request issued from the host computer 10 can be responded to more quickly.

Next, a sequence of operations to be performed in response to a write command or read command on the basis of the data processing technique of this embodiment will be described below.

Figure 10:
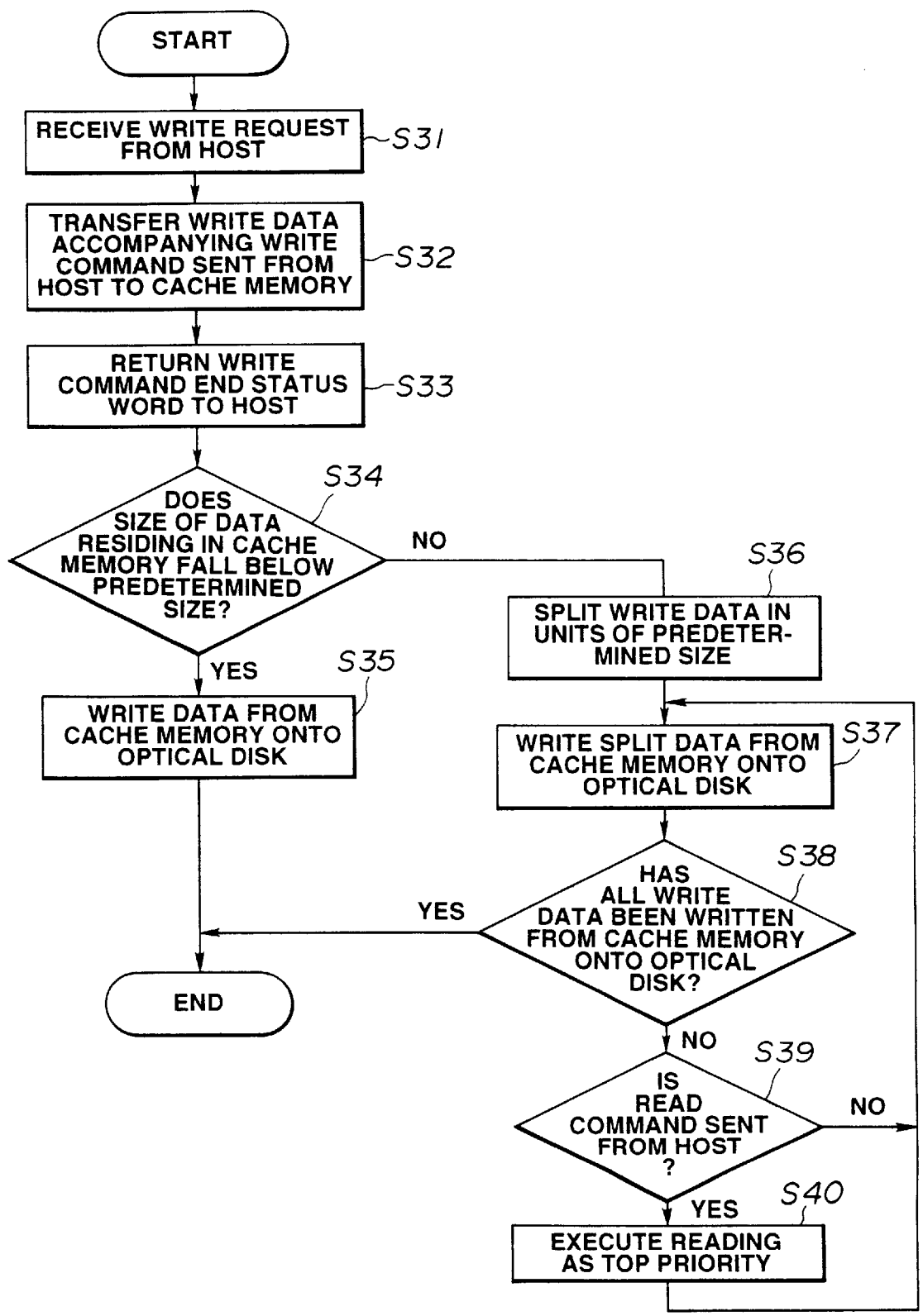

To begin with, a data processing sequence to be followed when a write command is received from the host computer 10 will be described with reference to FIG. 10.

After a write command is received from the host computer 10 and when a write request is received from the host computer 10 at step S31, at step S32, the CPU 8 transfers write data accompanying the write command sent via the interface 9 to the cache memory 6, temporarily stores the write data in the cache memory 6, and waits until writing of the write data in the cache memory 6 is completed.

When the writing of the write data in the cache memory 6 is completed at step S32, control is passed to step S33. The CPU 8 sends a write command end status word indicating termination of the data recording requested with the write command to the host computer 10 via the interface 9, and thus returns the completion of processing requested with the sent command as a response to the host computer 10. The host computer 10 then becomes aware of the completion of processing requested with the write command. The optical disk apparatus 1 can now receive the next command.

The CPU 8 then determines whether the size of the write data stored in the cache memory 6 at step S32 falls below a predetermined size. If the write data falls below the predetermined size, the write data is written from the cache memory onto the optical disk 2 at step S35. Data writing is then terminated.

If it is determined at step S34 that the size of the write data exceeds the predetermined size, the write data is split in units of the predetermined size at step S36.

When the CPU 8 terminates data split, an unwritten-on-disk flag is set relative to the data split at step S36. An LBA that is track information and a length that is data size information, which are contained in the command accompanied with the data split at step S36, are transferred to the memory 7. In addition, the unwritten-on-disk flag is stored in the memory 7.

The CPU 8 then transfers the write data, which has been split at step S36, from the cache memory 6 to the optical disk 2 via the head driver 5 independently of an operation of the host computer 10, and thus records the write data on the optical disk 2 at step S37.

When writing of the split write data on the optical disk 2 is completed at step S37, control is passed to step S38. It is then determined whether the write data has been all written from the cache memory 6 onto the optical disk 2.

If it is determined at step S38 that writing of all the split write data on the optical disk 2 is completed, the CPU 8 clears information concerning the split write data transferred to the memory 7, that is, the unwritten-on-disk flag, LBA, and length from the memory 7. The CPU 8 thus terminates the writing of the write data.

If it is determined at step S38 that unwritten write data still resides in the cache memory 6, the CPU 8 does not clear the unwritten-on-disk flag, LBA, and length, which are concerned with the split write data that has been transferred to and stored in the cache memory 6, but checks at step S39 if a read command or the like is sent from the host computer 10.

If a read request is issued from the host computer 10, processing of unwritten write data that has been split and resides in the cache memory is not started. Instead, reading requested with the read request sent from the host computer 10 is executed as a top priority at step S40.

After the step S40 is completed or if no read request is issued from the host computer 10, control is returned to S37. The unwritten write data that has been split and remains in the cache memory 10 is recorded on the optical disk 2. Thereafter, recording of all the split write data on the optical disk 2 is completed through steps S38 and S39 as mentioned above. When determining that writing of all the data on the optical disk 2 is completed, the CPU 8 clears the unwritten-on-disk flag, LBA, and length from the memory 7, and terminates the writing of the write data.

Figure 11:
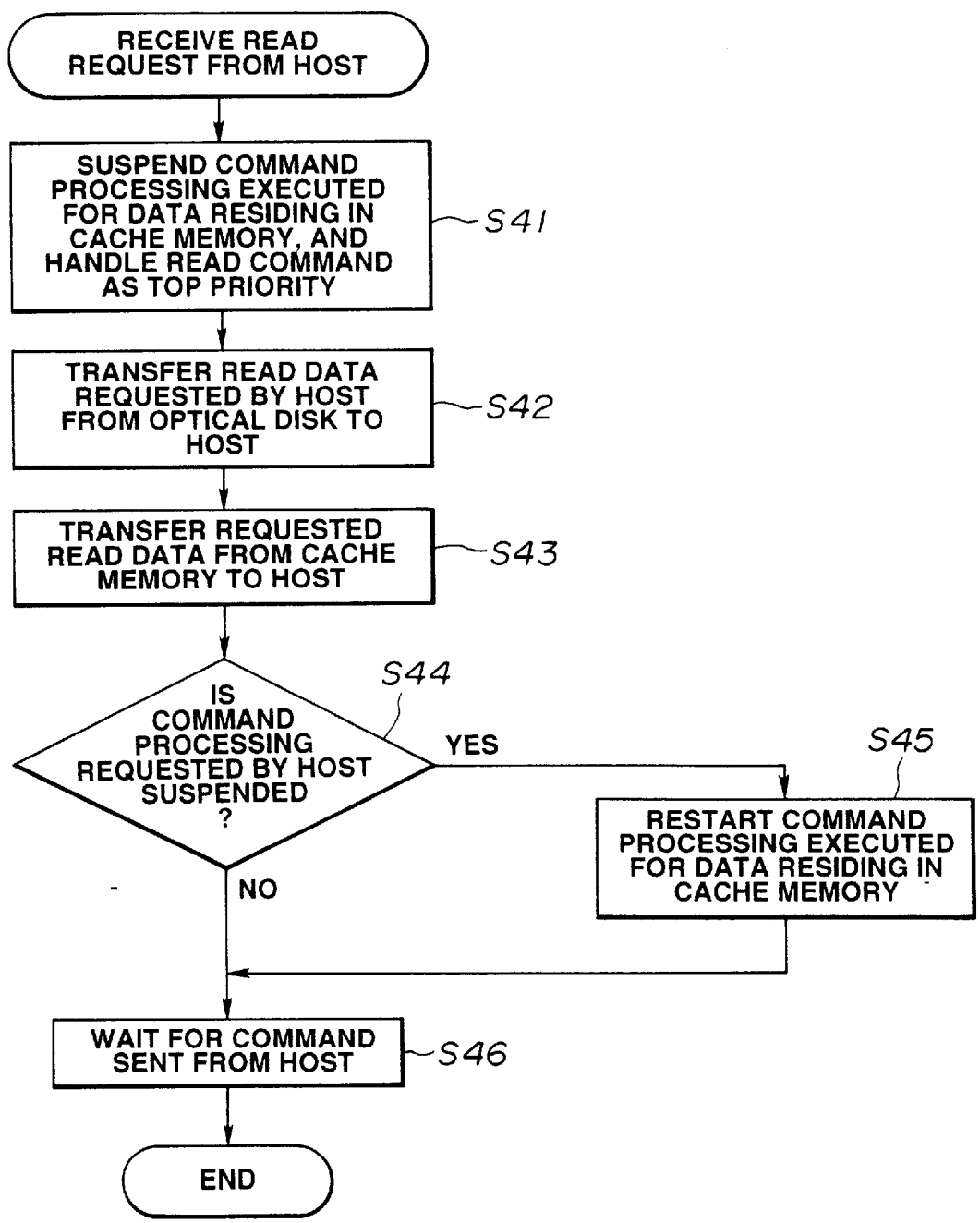

Next, a data processing sequence to be followed when a read command is received from the host computer 10 will be described with reference to FIG. 11. Herein, mention will be made of a sequence to be followed when a read command is received subsequently to a write command.

After a read command is received from the host computer 10, when a read request is received from the host computer 10, at step S41, the read command sent from the host computer 10 is handled as a top priority but command processing is not executed for unprocessed split write data remaining in the cache memory.

The CPU 8 sets a flag indicating a read command in response to the read command sent via the interface 9. The CPU 8 then transfers an LBA and-length contained in the received read command to the memory 7 and stores them in the memory 7. The flag indicating a read command is also stored in the memory 7.

At step S42, read data is read from the optical disk 2 according to an LBA and length specified in the read request, and transferred to the cache memory 6. At step S43, the read data is transferred from the cache memory 6 to the host computer 10 via the interface 9.

When a cache memory employed is of the write-back type in which data stored in the cache memory 6 during recording is read and transferred as it is in response to a read request sent from the host computer 10, desired data is not read from the optical disk 2 at step S42. Data requested with the read request is transferred as read data from the cache memory 6 to the host computer 10.

When transfer of the read data to the host computer 10 is completed, the CPU 8 posts a read command end status word to the host computer 10, clears the flag indicating a read command, LBA, and length from the memory 7, and then terminates data reading.

At step S44, it is determined whether command processing executed for write data sent from the host computer 10 is suspended. If the command processing requested by the host computer is suspended, the command processing executed for data residing in the cache memory 6 is restarted at step S45. The unprocessed split write data remaining in the cache memory 6 is transferred to and written on the optical disk 2. Control is then passed to step S46. The CPU 8 then waits until the next command is sent from the host computer 10.

If it is determined at step S44 that command processing requested by the host computer 10 is not suspended, the CPU 8 waits at step S46 until the next command is sent from the host computer 10.

Figure 12:
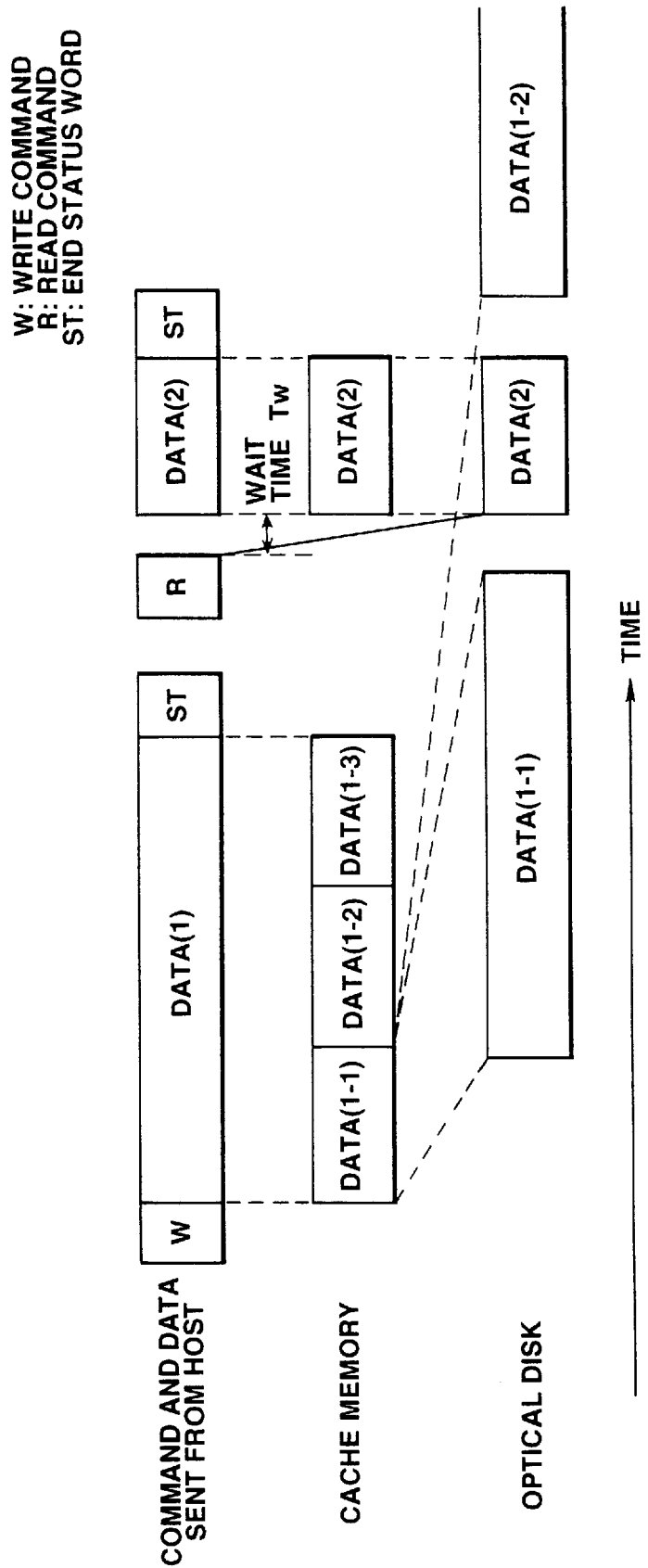

FIG. 12 shows the timing of data processing to be executed in response to a read command after writing is completed in this embodiment.

FIG. 12 shows operations to be performed when a read command is received subsequently to a write command, wherein unprocessed split write data remains in the cache memory, and a read request is issued from the host computer. In FIG. 12, W denotes a write command, R denotes a read command, and ST denotes an end status word indicating termination of processing requested with a command.

A write command issued from the host computer 10 is sent to the optical disk apparatus. When the write command is received in the optical disk apparatus, write data (data (1)) accompanying the command is transferred to the cache memory 6 and temporarily stored therein.

As soon as writing of the data (1) in the cache memory 6 is completed, the end status word is returned to the host computer 10. This enables reception of the next command. Thereafter, the CPU 8 splits the data (1) in the cache memory 6 into data (1-1), data (1-2), and data (1-3) independently of an operation of the host computer 10. The split write data is then successively transferred to the optical disk 2 serving as a recording medium and recorded thereon.

In this embodiment, similarly to the first embodiment, when data transfer from the host computer 10 to the cache memory 6 is completed, a command end status word is returned. The next command can therefore be received immediately. Data transfer can be achieved efficiently.

To be more specific, when a write command is received, write data (data (1)) accompanying the command is stored-in the cache memory 6. When writing of the data (1) in the cache memory 6 is completed, an end status word is returned to the host computer 10.

Thereafter, the data (1) stored in the cache memory 6 is split in units of a predetermined data size. The split write data (composed of data (1-1), data (1-2), and data (1-3)) is successively transferred to the optical disk 2 and recorded thereon.

When a read command is received subsequently to a write command, it is determined at step S38 shown in FIG. 10 whether all the write data has been transferred from the cache memory 6 onto the optical disk 2.

When unprocessed split write data remains in the cache memory 6 and if a read request is issued from the host computer, as shown in FIG. 12, data processing is executed with the read request given priority. In this case, when writing of the data (1-1) on the optical disk 2 is in progress, if a read request is issued, writing of the data (1-2) in the cache memory 6 is not started but suspended. Processing requested with the read command is executed as a top priority.

Specifically, as soon as a read command is received, read data (data (2)) requested by the host computer 10 is read from the optical disk 2, and transferred to the host computer 10 via the cache memory 6. An end status word is then sent to the host computer 10. Thereafter, writing of write data in the cache memory 6 is restarted. The data (1-2) is thus transferred to and recorded on the optical disk 2. In this case, a wait time Tw hardly occurs until reading of read data is executed after a read command is received.

As described above, according to this embodiment, write data stored in a cache memory in response to a write command sent from a host computer is split in units of a predetermined size. Writing of the data from the cache memory onto a recording medium is then executed. Therefore, when a read command is received from the host computer, if unprocessed split write data remains in the cache memory, writing of data from the cache memory onto the recording medium is suspended. Thus, another writing is not started, but processing requested with the read command is executed as a top priority in order to read data.

Similarly to the first embodiment, even in this embodiment, processing requested with a read command succeeding a write command can be executed swiftly. A wait time occurring in the host computer can be reduced. Consequently, data transfer to or from the host computer can be achieved smoothly and efficiently.

According to the aforesaid description, time-consuming recording or writing of data on a recording medium is carried out as follows: data to be recorded is split and temporarily stored in an intermediate memory; the split data stored in the intermediate memory is successively recorded on a recording medium; if a playback or read command is issued in the course of the recording and when recording of the split data being recorded is completed, recording is suspended and playback that is faster (requires less time) than the recording is executed as a top priority; data reproduced by playback is transferred to a host computer; and then the suspended data record is restarted. Alternatively, recording or writing of data may be carried out as described below.

Specifically, when a playback command or read command is issued in the course of recording, the size of data that has or has not been recorded so far is stored in the intermediate memory or memory. Thereafter, data recording is suspended, and playback that is faster (requires less time) than recording is executed as a top priority. Data reproduced by playback is then transferred to the host computer. Thereafter, the suspended data record is restarted.

Next, examples of the configuration of a disk cache control unit will be presented as the third and fourth embodiments. When included in a recording/reproducing apparatus having a write-after type cache memory means, the disk cache control unit helps improve data reliability and reduce an access time required for gaining access in response to a read command.

Figures 13, 16:
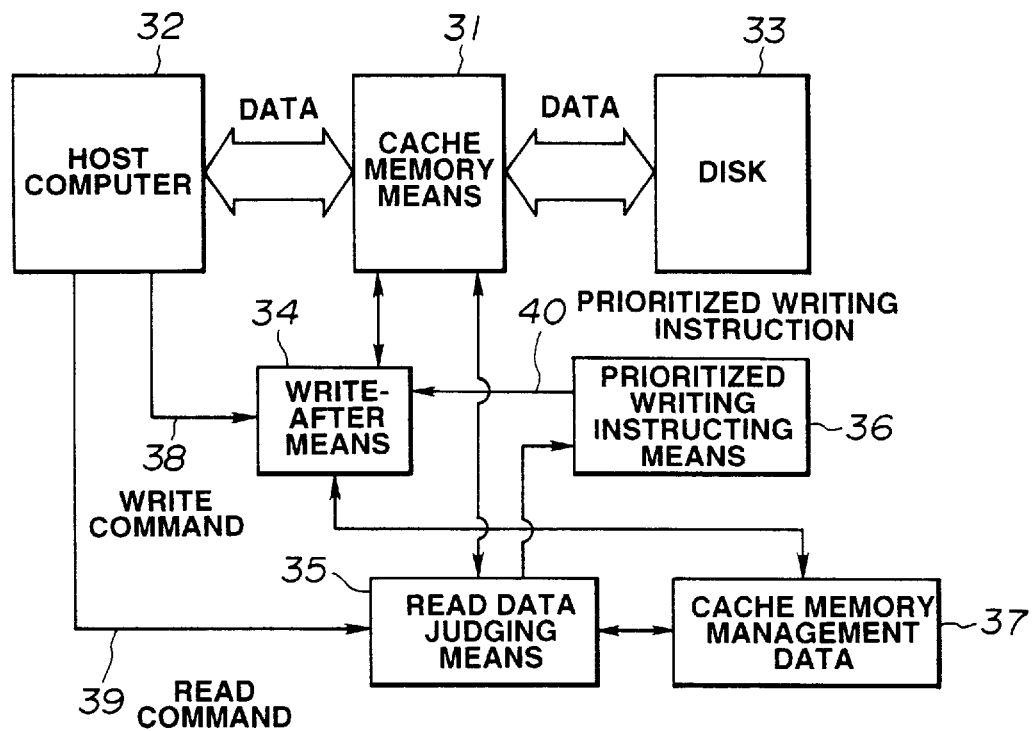
FIG. 13 is a block diagram showing the functional configuration of a disk cache control unit in the third and fourth embodiments of the present invention.
FIGS. 14 to 16 relate to the third embodiment of the present invention.

To begin with, the functional configuration employed in the third and fourth embodiments will be described briefly in conjunction with FIG. 13. FIG. 13 is a block diagram showing the functional configuration of a disk cache control means.

A disk cache control unit of this embodiment has a cache memory means 31 for storing data to be transferred. Data is transferred between a host computer 32 and a disk 33 serving as a recording medium via the cache memory means 31.

The disk cache control unit comprises: a write-after means 34 for writing data, which has not been written on the disk 33 but stored in the cache memory 31, on the disk 33 during an idle time in response to a data write request (write command) sent from the host computer 32; a read data judging means 35 for executing reading after determining whether requested read data resides in the cache memory means 31 and has not been written on the disk 33 in response to a data read request (read command) sent from the host computer 32; and a prioritized writing instructing means 36 that when the read data resides in the cache memory means 31 but has not been written on the disk 33, instructs the write-after means 34 to write the unwritten data from the cache memory means 31 onto the disk 33 as a top priority.

In the foregoing configuration, a write command 38 issued from the host computer 32 is sent to the write-after means 34. In response to the write command 38, the write-after means 34 writes data on the disk 33 via the cache memory means 31 according the write-after method. Specifically, the data is stored in the cache memory means 31. A signal indicating termination of writing is returned to the host computer 32. Writing is completed in order to make another processing excutable in the host computer 32. Thereafter, the unwritten data stored in the cache memory means 31 is written on the disk 33 during an idle time of data processing.

When the writing of data on the disk 33 is completed, the write-after means 34 updates cache memory management data 37. Specifically, "written" is specified for the written data in the cache memory management data 37, whereby the written data is validated in the cache memory means 31.

A read command 39 issued from the host computer 32 is sent to the read data judging means 35. In response to the read command 39, the read data judging means 35 references the cache memory management data 37 so as to determine whether requested read data resides in the cache memory means 31 and has not been written on the disk. If the requested read data does not reside in the cache memory means 31, data is read from the disk 33 and transferred to the host computer 32. When the requested read data resides in the cache memory means 31 and has already been written on the disk 33, the data is read from the cache memory means 31 and transferred to the host computer 32.

A signal representing a judgment of the read data judging means 35 is sent to the prioritized writing instructing means 36. When the requested read data resides in the cache memory means 31 and has not been written on the disk 33, the prioritized writing instructing means 36 issues a prioritized writing instruction 40 to the write-after means 34 and thus instructs the write-after means 34 to write the requested read data as a top priority. With the prioritized writing instruction 40, the write-after means 34 writes the requested data from the cache memory means 31 on the disk 33 as a top priority. When completing the writing, the write-after means 34 updates the cache memory management data 37. After the updating is completed, the read data judging means 35 reads the requested data from the cache memory means 31 or disk 33 and transfers the data to the host computer 32.

As mentioned above, when data requested to be read and stored in the cache memory 31 has not been written, the data is written on the disk 33 as a top priority. Thereafter, the data is read from the cache memory 31 or disk 33 and transferred. This leads to an improvement of an access time required for gaining access in response to a read request.

Next, mention will be made of an example in which the disk cache control unit shown in FIG. 13 is adapted to an optical disk apparatus using an optical disk medium such as a magneto-optical disk as a recording medium (disk 33).

Figure 14:
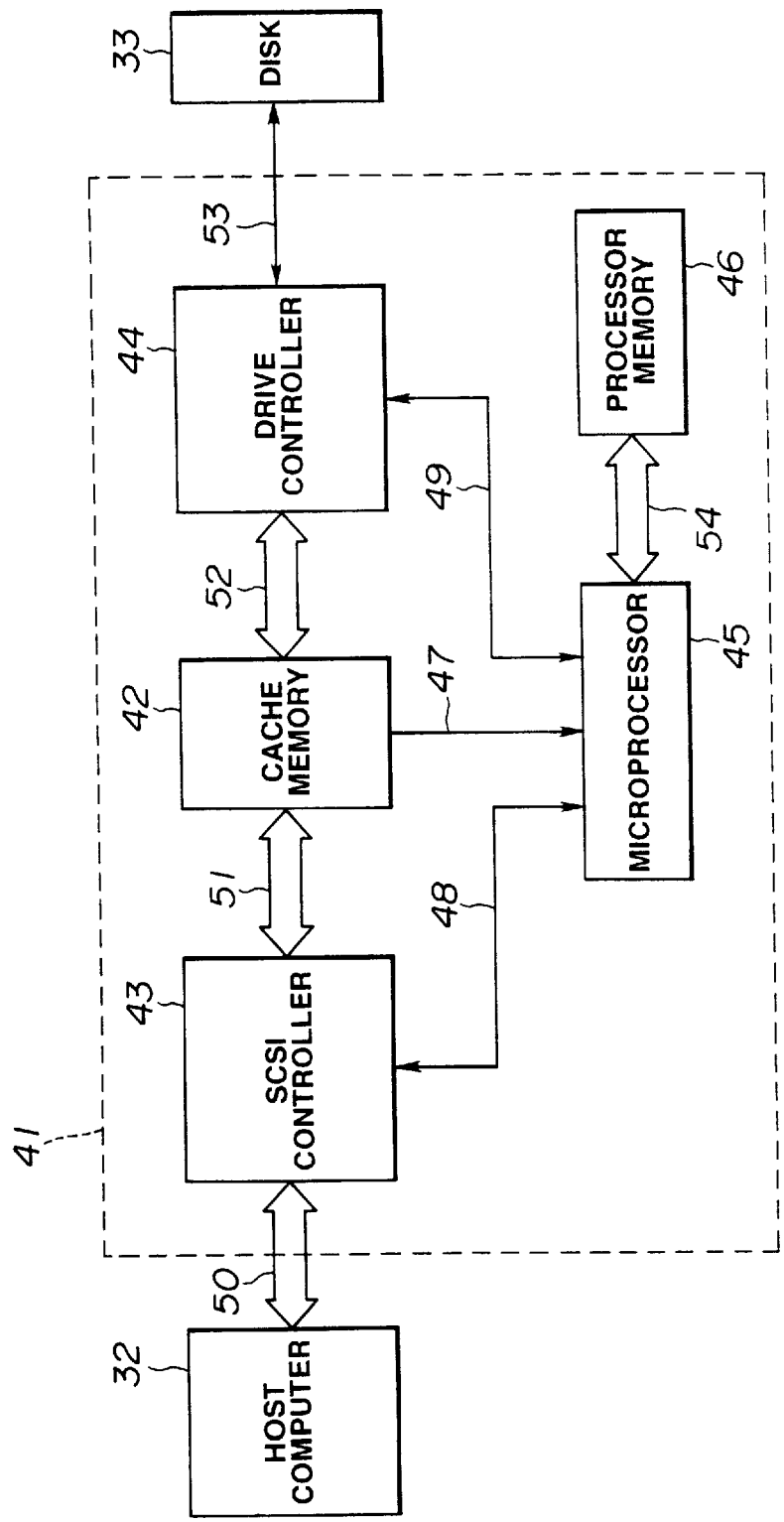
Figure 15:
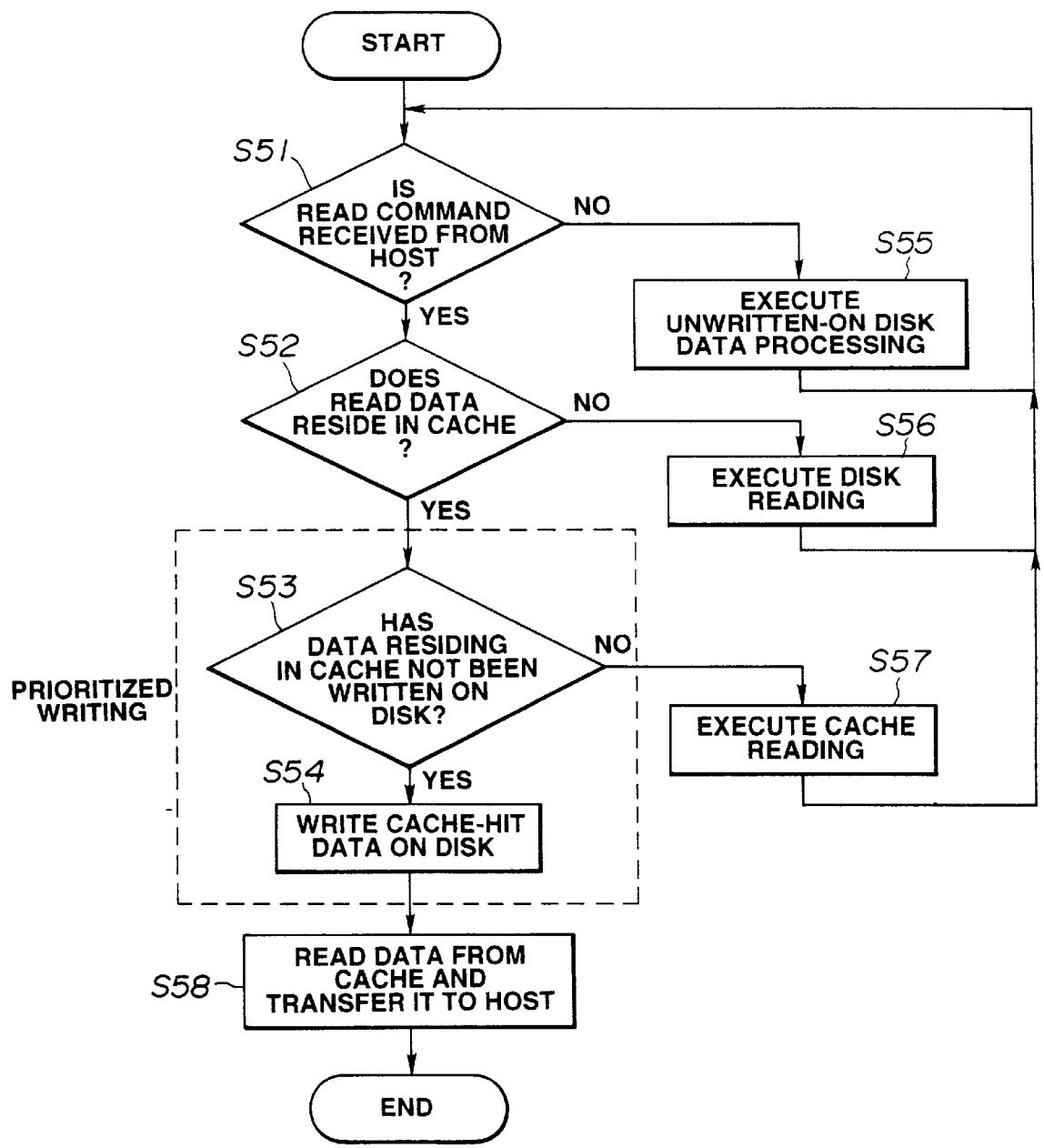

FIGS. 14 to 16 show the third embodiment of the present invention. FIG. 14 is a block diagram showing the hardware configuration of a disk cache control unit.

A disk cache control unit 41 comprises: a cache memory 42 for storing data to be transferred between the host computer 32 and disk 33; an SCSI controller 43 for controlling input or output of a command or data from or to the host computer 32, and input or output of data from or to the cache memory 42; a drive controller 44 for controlling input or output of data from or to each of the disk 33 and cache memory 42; a microprocessor 45 for inputting or outputting a command or data from or to each of the cache memory 42, SCSI controller 43, and drive controller 44; and a processor memory 46 for storing commands or data to be handled by the microprocessor 45.

The microprocessor 45 is connected to each of the cache memory 42, SCSI controller 43, and drive controller 44 via a cache memory-microprocessor interface 47, SCSI controller-microprocessor interface 48, and drive controller-microprocessor interface 49 respectively. The host computer 32 and SCSI controller 43 are linked by an SCSI bus 50. The SCSI controller 43 and cache memory 42 are linked by an SCSI controller-cache memory bus 51. The cache memory 42 and drive controller 44 are linked by a cache memory-drive controller bus 52. The drive controller 44 and disk 33 are connected mutually via a disk read/write data interface 53. The microprocessor 45 and processor memory 46 are linked by a processor bus 54.

The write-after means 34, read data Judging means 35, and prioritized writing instructing means 36 are realized with software programs running under the microprocessor 45.

Data sent from the host computer 32 is fed to the SCSI controller 43 by way of the SCSI bus 50. The SCSI controller 43 transmits a command, which is accompanied with the data and issued from the host computer, to the microprocessor 45 via the SCSI controller-microprocessor interface 48. The microprocessor 45 analyzes the contents of the received command and posts the command to each of the SCSI controller 43 and drive controller 44 via the SCSI controller-microprocessor interface 48 and drive controller-microprocessor interface 49 respectively. Thus, reading or writing of data and other necessary processing are executed.

Referring to FIG. 15, the operations to be performed by the microprocessor 45 when a write-after type cache memory is used will be described. Herein, a command sent from the host computer 32 is a read command. The microprocessor 45 receives the command issued from the host computer 32 from the SCSI controller 43 via the SCSI controller-microprocessor interface 48. At step S51, the microprocessor 45 determines whether a read command has been received from the host computer 32.

When a read command has been received, the microprocessor 45 allows the read data judging means 35 to reference a cache memory management table, which resembles the one shown in FIG. 16 and resides in the processor memory 46, by way of the processor bus 54, and thus determines at steps S52 and S53 whether read data requested to be read resides in the cache memory 42 and has already been written on the disk 33.

The cache memory management table contains the cache memory management data 37 shown in FIG. 13, and comprises positions (addresses) of data in the cache memory 42, positions (addresses) of data on the disk 33, flags each indicating that data resides in the cache memory, which may be referred to as cache resident flags, and flags each indicating that data in the cache memory has already been written on the disk, which may be referred to as written-on-disk flags. The cache resident flag is set to "1" when data resides in the cache memory, but reset to "0" when data does not reside therein. The written-on-disk flag is set to "1" when data has been written on a disk, but reset to "0" when data has not.

For example, the first line in the table is concerned with data whose position on a disk is "3." The data resides at position "0" in the cache memory and has already been written on the disk. When the data is requested with a read command, it can be transferred directly from the cache memory 42 to the host computer 32. By contrast, the second line in the table is concerned with data whose position on a disk is "5." The data resides at position "3" in the cache memory and has not been written on the disk. When the data is requested with a read command, it is first written at position "5" on the disk as a top priority and then transferred from the cache memory 42 to the host computer 32.

The cache memory management table may be preserved in the cache memory 42. Data may be transferred to or from the microprocessor 45 via the cache memory-microprocessor interface 47.

If it is determined at step S51 that a read command has not been received, control is passed to step S55. Unwritten-on-disk data processing is executed. Specifically, the microprocessor 45 allows the write-after means 34 to instruct the drive controller 44 to write unwritten data from the cache memory 42 onto the disk 33. After the writing is completed, a written-on-disk flag associated with the data in the cache memory management table is set to "1."

When it is found by referencing the cache memory management table at step S52 that read data does not reside in the cache memory 42, control is passed to step S56. Disk reading is executed. Specifically, the microprocessor 45 instructs each of the drive controller 44 and SCSI controller 43 to read requested read data from the disk 33 and write it in the cache memory 42. The data is then transferred to the host computer 32 by way of the SCSI bus 50. After data is written in the cache memory 42, the microprocessor 45 sets a cache resident flag and written-on-disk flag associated with the data in the cache memory management table to "1."

When it is found by referencing the cache memory management table at steps S52 and S53 that read data requested with a read command sent from the host computer resides in the cache memory 42 (cache hit) and has already been written on the disk 33, control is passed to step S57. Cache reading is executed. Specifically, the microprocessor 45 instructs the SCSI controller 53 to read data from the cache memory 42 by way of the SCSI controller-cache memory bus 51, and transfer it as read data to the host computer 32 by way of the SCSI bus 50. This processing obviates the necessity of actually reading data from a disk. An access time required for gaining access in response to a read command sent from a host computer is reduced drastically.

By contrast, when it is found by referencing the cache memory management table at steps S52 and S53 that read data requested with a read command sent from the host computer resides in the cache memory 52 but has not been written on the disk 33, control is passed to step S54. Prioritized writing is executed. Specifically, the microprocessor 54 allows the prioritized writing instructing means 36 to instruct the drive controller 44 to write data, which resides in the cache memory 42 and is a duplicate of read data requested with the read command, on the disk 33 as a top priority.

At this time, the drive controller 44 reads data, which is a duplicate of the data requested with the read command, from the cache memory 42 by way of the cache memory-drive controller bus 52. The drive controller 44 then performs operations needed to write the data on a disk; such as, appending of error-correcting data and modulation on the data, and then writes the resultant data on the disk 33 via the disk read/write data interface 53.

At step S58, the microprocessor 45 sets a written-on-disk flag associated with the data in the cache memory management table to "1," and instructs the SCSI controller 43 to read data from the cache memory 42 by way of the SCSI controller-cache memory bus 51. The data is then transferred as read data to the host computer 32 by way of the SCSI bus 50.

Owing to the foregoing sequence, in this embodiment, when a read command is received in the course of write-after processing in which data temporarily stored in the cache memory 42 in response to a write command is written on the disk 33 during an idle time of data processing, if data requested with the read command resides in the cache memory 42, data that has not been written on the disk need not be transmitted from the cache memory 42 to the host computer 32. The host computer 32 will therefore not receive unwritten data and recognize termination of normal reading.

When an abnormality occurs on a disk, if writing of data on the disk is disabled afterward, unwritten data may be lost because it cannot be restored. Even when this kind of event occurs, the third embodiment can prevent loss of data. Consequently, data reliability improves.

When data requested with a read command resides in the cache memory 42 but has not been written on the disk 33, conventionally, processing requested with the read command sent from a host computer is not executed until writing-of all data residing in the cache memory on the disk is completed. According to the third embodiment, data that is a duplicate of data requested with the read command is written on the disk as a top priority. When the writing is completed, read data is transmitted to the host computer. An access time required for gaining access in response to a read command sent from the host computer can therefore be shortened drastically.

Next, an example in which the operations of a microprocessor in the third embodiment are modified will be described as the fourth embodiment below.

Figure 17:
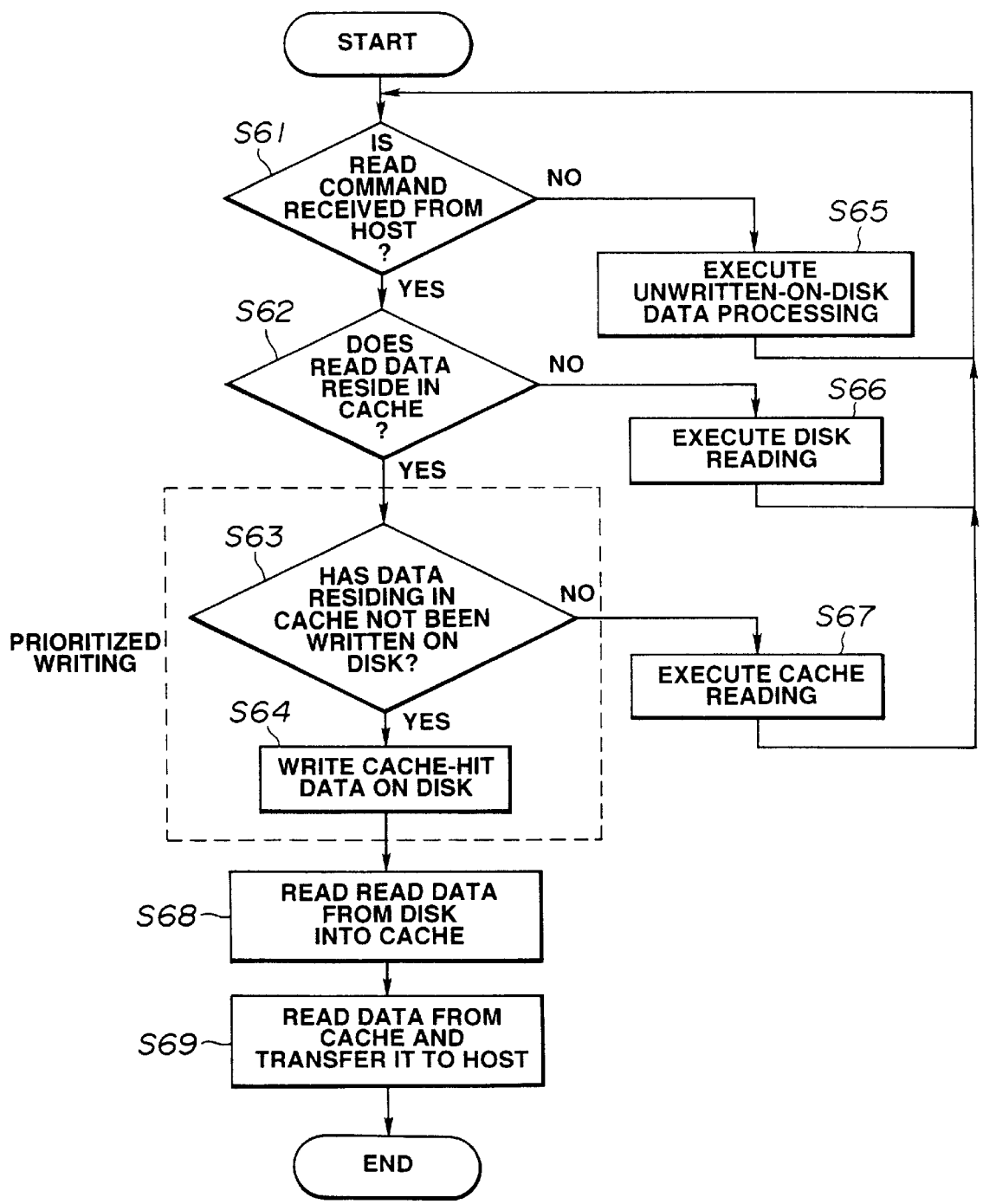
FIG. 17 is a flowchart describing operations to be performed by a microprocessor in the fourth embodiment.

The configuration is identical to that of the third embodiment. The description of the configuration will therefore be omitted. Herein, the operations of a microprocessor will solely be described in conjunction with FIG. 17.

In the fourth embodiment, the operations of steps 61 to 67 are identical to those of steps S51 to S57 in FIG. 15. That is to say, when it is found by referencing the cache memory management table at steps S62 and S63 that read data requested with a read command sent from the host computer resides in the cache memory 42 but has not been written on the disk 33, control is passed to step S64. Prioritized writing is executed. Specifically, the microprocessor 45 allows the prioritized writing instructing means 36 to instruct the drive controller 44 to write data, which resides in the cache memory 42 and is a duplicate of the read data requested with the read command, on the disk as a top priority.

At this time, the drive controller 44 reads the data, which is a duplicate of the data requested with the read command, from the cache memory 42 over the cache memory-drive controller bus 52. After performing operations needed to write the data on the disk; such as, appending of error-correcting data and modulation on the data, the drive controller 44 writes the resultant data on the disk 33 via the disk read/write data interface 53.

At step S68, the microprocessor 45 instructs the drive controller 44 to read data, which is a duplicate of the read data requested with the read command, from the disk 33 into the cache memory 42. At this time, the drive controller 44 reads the data, which is a duplicate of the read data requested with the read command, from disk 33 via the disk read/write data interface 53. After performing demodulation, error correction, and other operations on the data, the drive controller 44 writes the resultant data in the cache memory 42 by way of the cache memory-drive controller bus 52.

At step S69, the microprocessor 45 sets a written-on-disk flag associated with the data in the cache memory management table to "1," and instructs the SCSI controller 43 to read the data from the cache memory 42 by way of the SCSI controller-cache memory bus 51. The data is then transferred as read data to the host computer 32 over the SCSI bus 50.

According to the foregoing sequence, data to be transmitted to the host computer 32 is data actually read from the disk 33. Even when errors in data read from the disk cannot be corrected, the host computer becomes aware of the fact.

The fourth embodiment has the same advantage as the third embodiment. In addition, since a host computer can restore data reliably, data reliability improve drastically.

For the aforesaid embodiments, sequences of data processing requested with a write command or read command are described by taking an optical disk apparatus using an optical disk as a recording medium for instance. The present invention can also apply to an information recording/reproducing apparatus using any other kind of recording medium.

The aforesaid embodiments have been described by presenting sequences of recording and reproducing of data. The present invention may apply to any other processing (for example, retrieval). The present invention is also concerned with an apparatus and method in which, after a first command requesting time-consuming processing of at least two commands; that is, first and second commands requesting first and second processing is issued, if the second command requesting processing that requires less time is issued in the course of the first processing, the first processing is suspended. After the second processing is executed, the suspended first processing is restarted.

In the present invention, it will be apparent that a wide range of different embodiments can be formed on the basis of the invention without a departure from the spirit and scope of the invention. This invention will be limited to the appended claims but not be restricted to any specific embodiments.

What is claimed is:

1. An information recording/reproducing apparatus for recording or reproducing information on or from a recording medium in response to a command sent from a host computer, comprising:

an intermediate memory means for temporarily storing information to be transferred to or from said host computer;

a writing completion reporting means for reporting completion of writing of information to said host computer at the end of storing record data transferred from said host computer in said intermediate memory means in response to an information record command sent from said host computer;

a medium writing means for writing said record data stored in said intermediate memory means on a recording medium independently of data transfer between said host computer and intermediate memory means;

a write data Judging means for determining whether playback data requested with an information playback command sent from said host computer is consistent with unprocessed record data of which writing on a recording medium has not been completed and which is stored in said intermediate memory means; and a prioritized reading executing means that when playback data requested by said host computer is inconsistent with or no duplicate of unprocessed record data stored in said intermediate memory means, suspends writing of data from said intermediate memory means onto a recording medium and executing processing requested with an information playback command sent from said host computer as a top priority in response to said information playback command.

2. An information recording/reproducing apparatus according to claim 1, wherein said write data judging means makes a determination by comparing track information and data size information concerning playback data requested by said host computer with those concerning unprocessed record data stored in said intermediate memory means.

3. An information recording/reproducing apparatus for recording or reproducing information on or from a recording medium in response to a command sent from a host computer, comprising:

an intermediate memory means for temporarily storing information to be transferred to or from said host computer;

a writing completion reporting means for reporting completion of writing of information at the end of storing record data transferred from said host computer in said intermediate memory means in response to an information record command sent from said host computer;

a write data splitting means for splitting record data stored in said intermediate memory means in predetermined units;

a medium writing means for writing said split record data on a recording medium independently of data transfer between said host computer and intermediate memory means; and a prioritized reading executing means for suspending writing of data from said intermediate memory means onto a recording medium and executing processing requested with an information playback command sent from said host computer as a top priority in response to said information playback command.

4. An information recording/reproducing apparatus for recording or reproducing information on or from a recording medium in response to a command sent from a host computer;

a cache memory means for temporarily storing data transferred from said host computer;

cache memory management data for use in managing data residing in said cache memory means;

a write-after means for writing data, which has not been written on a recording medium and is stored in said cache memory means, on said recording medium;

a read data judging means that when an information playback command is received from said host computer, references said cache memory management data so as to judge the state of data requested by said host computer; and a prioritized writing instructing means that when it is determined on the basis of a judgment of said read data judging means that said requested data resides in said cache memory means but has not been written on said recording medium, instructs said write-after means to write said data from said cache memory means onto said recording medium as a top priority.

5. An information recording/reproducing apparatus according to claim 4, further comprising a reading means that after said prioritized writing of data on a recording medium is completed, transfers data read from said cache memory means as said requested data to said host computer.

6. An information recording/reproducing apparatus according to claim 4, further comprising a reading means that after said prioritized writing of data on a recording medium is completed, transfers data read from said recording medium as said requested data to said host computer via said cache memory means.

7. A data processing method employed in an information recording/reproducing apparatus that has an intermediate memory means for temporarily storing information to be transferred to or from a host computer and that records or reproduces information on or from a recording medium in response to a command sent from said host computer, comprising:

a step which is concerned with processing requested with an information record command and at which completion of writing of information is reported to said host computer at the end of storing record data transferred from said host computer in said intermediate memory means; and a step which is concerned with processing requested with an information playback command and at which when playback data requested by said host computer is inconsistent with or no duplicate of unprocessed record data of which writing on a recording medium has not been completed and which is stored in said intermediate memory means, writing of data from said intermediate memory means onto said recording medium is suspended and said processing requested with said information playback command is executed as a top priority.

8. A data processing method employed in an information recording/reproducing apparatus according to claim 7, wherein at said step concerned with processing requested with an information playback command, whether playback data requested by said host computer is consistent with unprocessed record data stored in said intermediate memory means is determined by comparing track information and data size information concerning playback data with those concerning record data.

9. A data processing method employed in an information recording/reproducing apparatus according to claim 7, wherein at said step concerned with said processing requested with an information record command, after completion of writing of information is reported to said host computer at the end of storing record data in said intermediate memory means, said record data stored in said intermediate means is written on a recording medium independently of an operation of said host computer.

10. A data processing method employed in an information recording/reproducing apparatus according to claim 7, wherein at said step concerned with said processing requested with an information playback command, said processing requested with an information playback command is executed as a top priority in order to read playback data from a recording medium, and then said suspended writing of record data from said intermediate memory means onto a recording medium is restarted.

11. A data processing method employed in an information recording/reproducing apparatus that has an intermediate memory means for temporarily storing information to be transferred to or from a host computer and that records or reproduces information on or from a recording medium in response to a command sent from said host computer, comprising:

a step which is concerned with processing requested with an information record command and at which record data transferred from said host computer is temporarily stored in said intermediate memory means, and then writing of record data from said intermediate memory means onto a recording medium is executed independently of data transfer between said host computer and intermediate memory means that is executed in response to another information record command or information playback command; and a step which is concerned with processing requested with an information playback command sent subsequently to said information record command, and at which: it is determined whether playback data requested by said host computer is consistent with unprocessed record data of which writing on a recording medium has not been completed and which is stored in said intermediate memory means; and when said playback data is inconsistent with or no duplicate of said record data, said processing requested with an information playback command is executed as a top priority in order to read playback data from said recording medium, and then said record data is written from said intermediate memory means onto said recording medium.

* * * * *